US012252004B2

(12) United States Patent
Conte et al.

(10) Patent No.: US 12,252,004 B2

(45) Date of Patent: Mar. 18, 2025

(54) RESERVE FUEL SYSTEM

(71) Applicant: S & J 17, LLC, Fort Wayne, IN (US)

(72) Inventors: Samuel S. Conte, Fort Wayne, IN (US); Jeffrey Britton, Leo, IN (US)

(73) Assignee: S & J 17, LLC, Fort Wayne, IN (US)

( * ) Notice: Subject to any disclaimer, the term of this patent is extended or adjusted under 35 U.S.C. 154(b) by 0 days.

(21) Appl. No.: 18/439,156

(22) Filed: Feb. 12, 2024

(65) Prior Publication Data

US 2024/0208324 A1 Jun. 27, 2024

Related U.S. Application Data

(63) Continuation of application No. 17/530,764, filed on Nov. 19, 2021, now Pat. No. 11,926,208, which is a continuation of application No. 17/038,007, filed on Sep. 30, 2020, now Pat. No. 11,230,185.

(60) Provisional application No. 62/908,911, filed on Oct. 1, 2019.

(51) Int. Cl.

*B60K 15/03* (2006.01)
*B60K 15/06* (2006.01)
*F02M 21/02* (2006.01)
*F02M 25/08* (2006.01)

(52) U.S. Cl.

CPC ........ *B60K 15/03006* (2013.01); *B60K 15/06* (2013.01); *F02M 21/0203* (2013.01); *F02M 21/0224* (2013.01); *F02M 21/023* (2013.01); *F02M 25/0836* (2013.01); *B60K 2015/03144* (2013.01); *B60K 2015/03256* (2013.01)

(58) Field of Classification Search

CPC .............. B60K 15/03006; B60K 15/06; B60K 2015/03144; B60K 2015/03256; B60K 2015/03026; F02M 21/0203; F02M 21/0224; F02M 21/023; F02M 25/0836

See application file for complete search history.

(56) References Cited

U.S. PATENT DOCUMENTS 2,532,316 A 12/1950 Larkin
2,786,353 A 3/1957 Slabaugh
4,271,700 A 6/1981 Tschanz et al.
4,462,418 A * 7/1984 Xander .................. F15B 21/02 137/624.14
5,026,001 A 6/1991 Wright et al.
5,938,147 A 8/1999 Degroff (Continued)

OTHER PUBLICATIONS

Austinflightcheck: "Aircraft Supplies—PitotShield Pitot Covers", Mar. 2, 2012 (Mar. 2, 2012), XP055907873.

(Continued)

*Primary Examiner* — Jacob M Amick
*Assistant Examiner* — Charles J Brauch
(74) *Attorney, Agent, or Firm* — Faegre Drinker Biddle & Reath LLP

(57) ABSTRACT

A reserve fuel tank retention and control (RTRC) module and a method of operating a vehicle including an engine and a main fuel tank containing a fuel, the method including mounting the RTRC module onto the vehicle; fluidly connecting the RTRC module to the engine and to the main fuel tank; actuating a valve of the RTRC module for a predetermined time to purge moisture in a fuel supply hose into the engine; and upon the main fuel tank becoming empty, actuating the valve to allow fuel from the reserve fuel tank to supply the engine.

20 Claims, 8 Drawing Sheets

100 20 124 210 212 230 122

(56) References Cited

U.S. PATENT DOCUMENTS

| | | | | |
|---|---|---|---|---|
| 6,279,612 | B1 * | 8/2001 | Warth .................... | B60K 15/06 137/255 |
| 6,412,343 | B1 | 7/2002 | Jefferson | |
| 6,612,521 | B1 | 9/2003 | DeGroff | |
| 7,175,344 | B2 | 2/2007 | D'Ouince et al. | |
| 8,132,471 | B2 | 3/2012 | Degroff et al. | |
| 8,636,240 | B2 | 1/2014 | Jefferson et al. | |
| 9,174,743 | B2 | 11/2015 | Dis | |
| 2010/0089147 | A1 | 4/2010 | Degroff et al. | |
| 2014/0331767 | A1 | 11/2014 | Dis | |
| 2019/0086438 | A1 | 3/2019 | Conte et al. | |

OTHER PUBLICATIONS

Degroff Aviation Technologies, instructions for Proper Use of PitotShield Safety Pitot Cover, Feb. 25, 2002, 2 pages, DeGroff Aviation Technologies.

Degroff Aviation Technologies, PitotShield FAQ's, Jul. 18, 2002, 4 pages, DeGroff Aviation Technologies.

Degroff Aviation Technologies, PitotShields Fact Sheet, 2002, 3 pages, DeGroff Aviation Technologies.

International Preliminary Report on Patentability received for PCT Patent Application No. PCT/US2018/051578, mailed on Apr. 2, 2020, 6 pages.

International Search Report and Written Opinion in related International Application No. PCT/US2018/051578, 6 pages, Nov. 20, 2018.

Product Brochure entitled "Instructions for Proper Use of PlitotShields Safety Pilot Covers", DeGroff Aviation Technologies, Berne, Indiana, undated, 3 pages.

Video https://www.youtube.com/watch?v=VkmESbNUetc Mar. 2, 2012;"PitotShield (Registered)" (Year: 2012).

Wayback_Machine_Sept_152012.pdfwww. DeGroffaviation.com/pitot-shield.html (Year: 2012).

* cited by examiner

RESERVE FUEL SYSTEM

CROSS-REFERENCE TO RELATED APPLICATIONS

The present application is a continuation of U.S. patent application Ser. No. 17/530,764, filed Nov. 19, 2021, which is a continuation of U.S. patent application Ser. No. 17/038,007, filed Sep. 30, 2020, which is now a U.S. Pat. No. 11,230,185 and claims priority from and the benefit of U.S. Patent Application No. 62/908,911, filed Oct. 1, 2019. The aforementioned applications are incorporated herein in their entirety.

FIELD OF THE DISCLOSURE

The present disclosure relates to reserve fuel tank systems for vehicles, and in particular to reserve fuel tank systems for vehicles with gaseous fuels stored in removable fuel tanks.

BACKGROUND

Many current industrial/commercial vehicles, such as fork trucks, are fueled by pressurized propane gas, contained in onboard fuel systems in the form of replaceable cylindrical fuel tanks connected to the engine by hoses. Said vehicles do not typically carry, nor have provision for, an onboard reserve fuel supply, and therefore the content of the propane tank determines how long the vehicle can continue operating before the propane tank has to be removed and replaced or refilled, which can occur on site or at a refueling station.

If refuelling is not anticipated, the vehicles' engine stops running rendering the vehicle inoperable before the mission of the vehicle is completed, i.e., "dead in the aisle", which in addition to costing time can cause a complete lane or aisle blockage with goods-in-transport not delivered. Inoperability during a mission can be disruptive to vital material flow, with costly downtime. In most cases the user-operator dismounts and hand carries the empty fuel tank to a refueling station, then returns with a replacement full tank. This can take 30-60 minutes, during which time the vehicle is immovable, potentially in an inconvenient place.

Further, purging a replacement fuel tank is usually necessary due to the inherent properties of propane fuel, particularly temperature sensitivity-caused condensation that is typical of fuel tank storage. Traditional purging requires manually "valving off" the condensate/contamination, which costs additional time.

SUMMARY OF THE DISCLOSURE

A reserve fuel tank retention and control (RTRC) module for a vehicle having an engine and a main fuel tank supplying fuel to the engine. In some embodiments, the RTRC module includes a fuel supply hose adapted to fluidly connect the RTRC module and the engine, a fuel intake hose adapted to fluidly connect the RTRC module and the main fuel tank, a reserve fuel tank, a first fluid circuit fluidly connecting the fuel supply hose and the fuel intake hose with a first check valve therebetween allowing flow from the fuel intake hose to the fuel supply hose, and a second fluid circuit fluidly connecting the fuel supply hose and the fuel intake hose, the second fluid circuit including a second check valve between the fuel intake hose and the reserve fuel tank and a valve between the reserve fuel tank and the fuel supply hose.

In some variations of the present embodiment, the valve is a solenoid valve activated by an electric switch having a first state and a second state. The first state implements a normal mode of operation in which the engine is supplied from the main fuel tank. The second state implements a reserve mode of operation in which the engine is supplied from the reserve fuel tank. In the first state the valve is closed, permitting fuel to flow in the first fluid circuit from the main fuel tank through the first check valve to the engine. In the second state the valve is open allowing fuel to flow from the reserve fuel tank through the solenoid valve to the engine.

In an example of the foregoing variation, a timer is provided to cause the solenoid valve to close after a predetermined time. The predetermined time is the time the vehicle is permitted to operate on reserve fuel. The predetermined time may be set to enable the vehicle to reach a refuelling station without allowing the reserve fuel tank to reach an empty state, defined as a state in which the reserve fuel tank cannot supply fuel to the engine even when the solenoid valve is open. A light may also be provided, which may be connected to the switch to illuminate in the reserve mode of operation.

In some embodiments, a method of operating a vehicle including an engine and a main fuel tank containing a fuel is provided, the method comprising: mounting a reserve fuel tank retention and control (RTRC) module onto the vehicle; fluidly connecting a fuel supply hose of the RTRC module to the engine; fluidly connecting a fuel intake hose of the RTRC module to the main fuel tank; actuating a valve of the RTRC module for a predetermined time to purge moisture in the fuel supply hose into the engine; and upon the main fuel tank becoming empty, actuating the valve for the predetermined time to allow fuel from the reserve fuel tank to supply the engine.

BRIEF DESCRIPTION OF THE DRAWINGS

The present disclosure will now be described in greater detail based on non-limiting exemplary embodiments and with reference to the drawings, on which.

DETAILED DESCRIPTION

Figure 1:
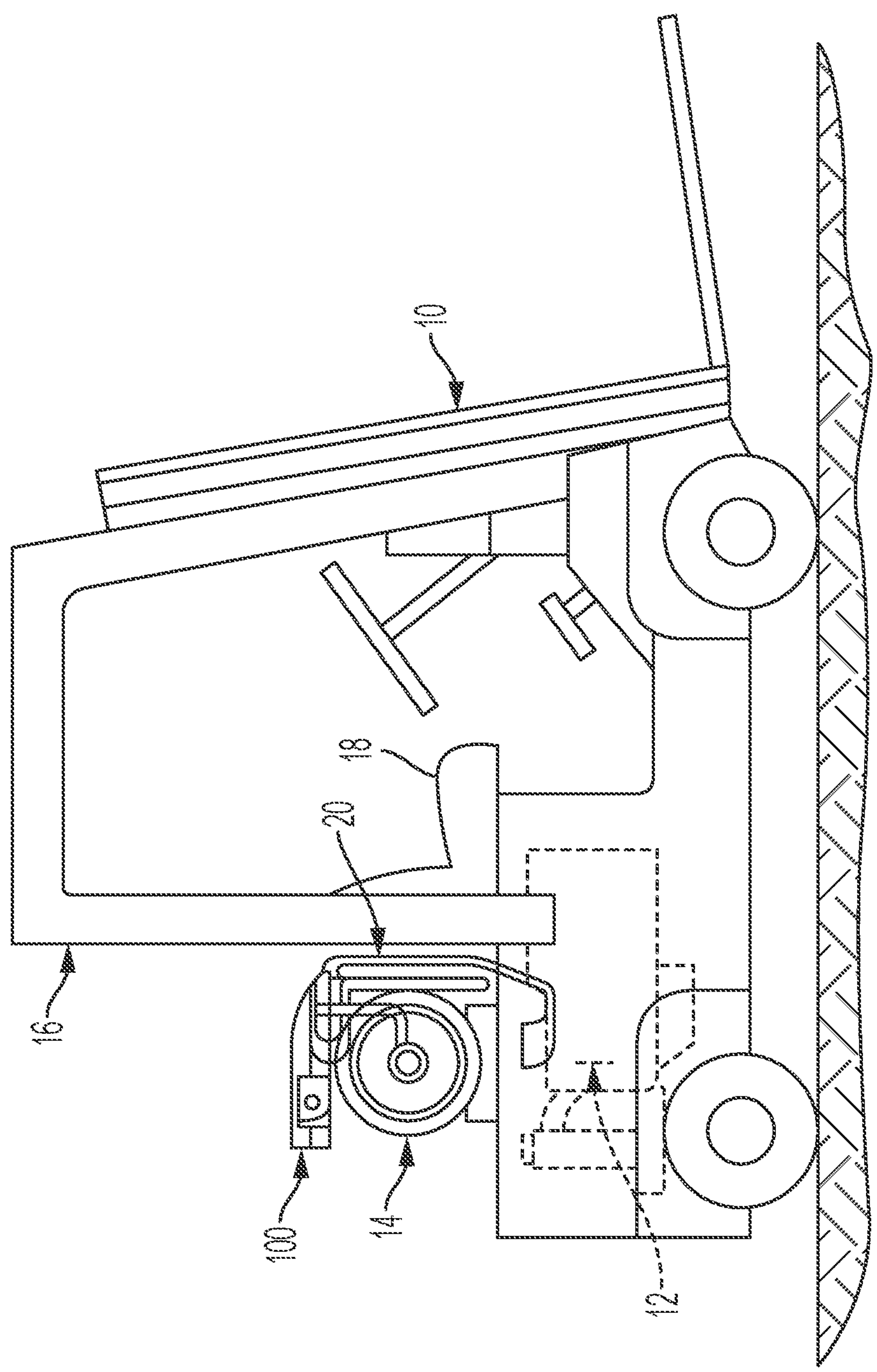
FIG. 1 is a side view of a vehicle including an RTRC module.

Turning first to FIG. 1, an RTRC module 100 is shown mounted on a vehicle 10, e.g. a fork truck, having an engine 12, a main fuel tank 14, a safety cage 16, and a seat 18 for an operator of vehicle 10. Main fuel tank 14 is located behind seat 18 above engine 12. RTRC module 100 is mounted on top of main fuel tank 14 and includes a reserve fuel tank 110 (see FIG. 4). A fuel supply hose 20 fluidly connects RTRC module 100 and engine 12.

RTRC module 100 is removable and substantially portable, meaning that can be easily transported and mounted to a vehicle, and then removed from the vehicle. By "substantially portable" it is meant that the module can be lifted and moved by personnel without use of lifting equipment, although some individuals might not have the physical strength to lift and carry the module by themselves. The RTRC module includes a control circuit designed to facilitate fluid connection of main fuel tank 14 or reserve fuel tank 110 to the engine. Use of FTRC module 100 reduces downtime and increases payback on the vehicle. Additionally, while prior art circuits may be designed to purge condensation to the environment, FTRC module 100 purges directly to the engine. The timed function of valve 146 ensures purging is sufficient.

Although the FTRC module is generally described in the context of a propane powered fork truck, it should be understood that the FTRC module can be used with any vehicle that can be fueled from a reserve tank.

Figure 2:
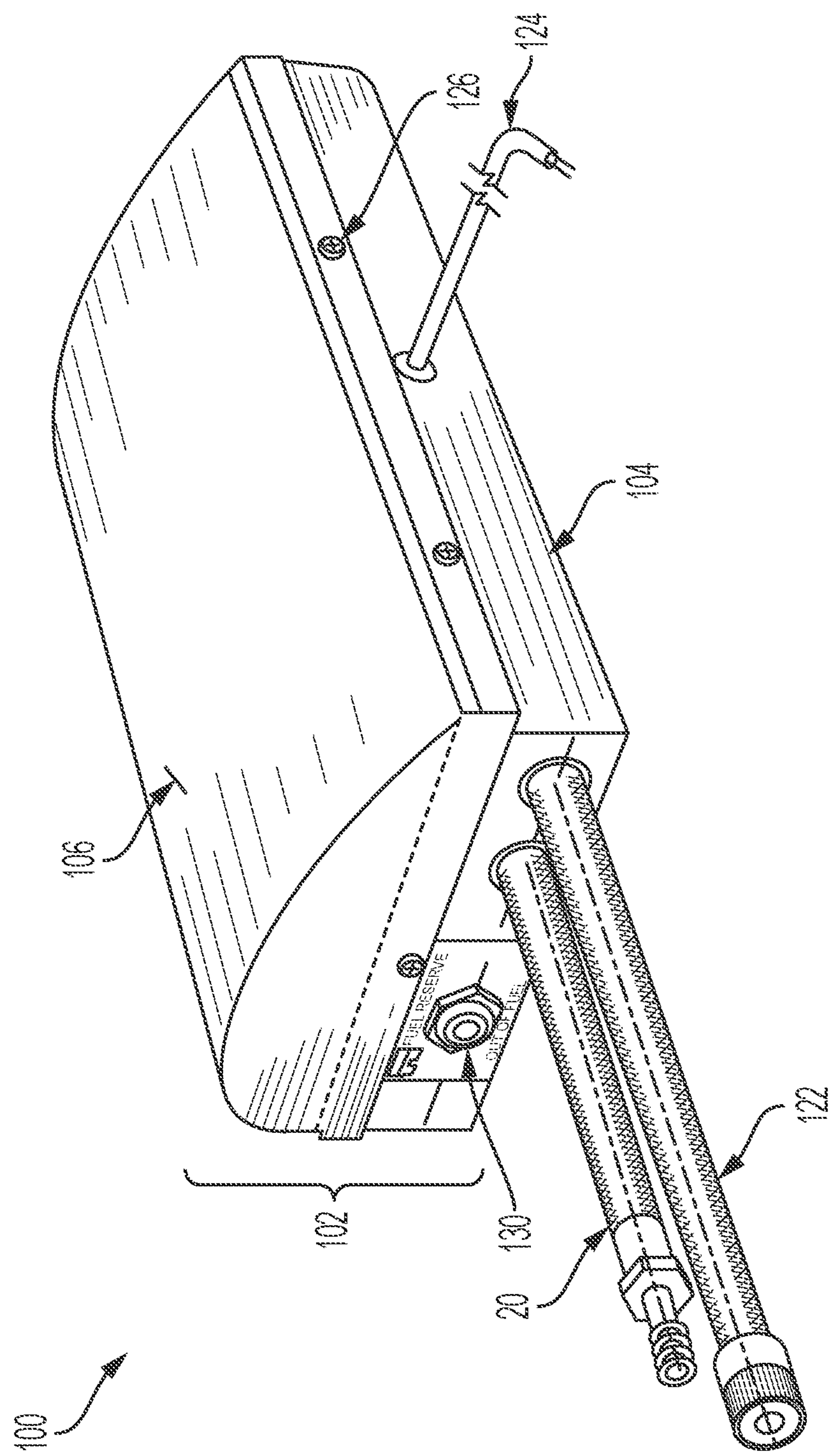
FIG. 2 is a perspective view of an embodiment of the RTRC module of FIG. 1.

Turning now to FIG. 2, RTRC module 100 comprises an enclosure 102 having a base 104 and a lid 106. A control actuator 130, illustratively an electric switch, is located on a side of enclosure 102, preferably on a side of base 104. Hoses 120 and 122 are shown extending from base 104 of enclosure 102. A conduit 124 also extends from base 104 and is connected (not shown) to the battery of the vehicle. A plurality of fasteners 126 secure lid 106 to base 104.

Figure 3:
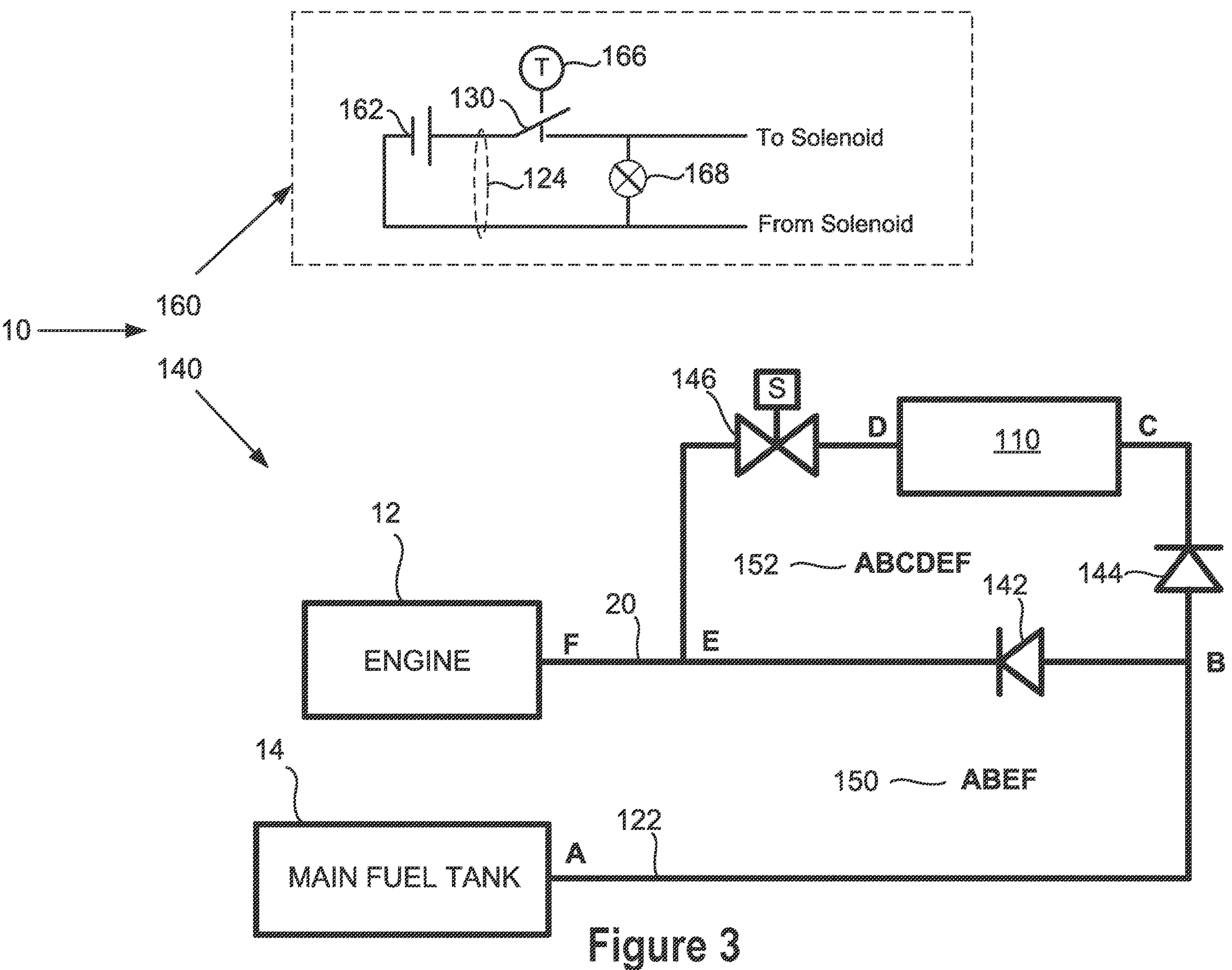
FIG. 3 is a schematic view of electrical and fluid circuits of the FTRC module of FIG. 1.

FIG. 3 is a schematic view of embodiments of fluid and electrical circuits 140, 160, respectively, of FTRC module 100. Fluid circuit 140 comprises a first subcircuit 150 and a second subcircuit 152. First subcircuit 150 extends between junctions ABEF, from fuel intake hose 122 through a first check-valve 142 to fuel supply hose 20.

When first subcircuit 150 is pressurised, or active, the vehicle is in a normal state of operation or in a purging state of operation, in both states fuel pressure from main fuel tank 14 causing fuel to flow from junction A through first check-valve 142, junction E, and supply fuel hose 20, to engine 12. In the purging state, valve 146 is open and fuel pressure from main fuel tank 14 also causes fuel to flow from junction B through a second check-valve 144, reserve fuel tank 110, valve 146, and supply fuel hose 20, to engine 12, thereby purging the system. After the purging state valve 146 is closed and reserve fuel tank 110 is full.

Electrical circuit 160 includes a battery 162, electric switch 130, a timer 166 connected to electric switch 130, and a reserve mode indicator 168, illustratively a light. In the present embodiment, electrical circuit 160 is connected to the solenoid of valve. When the switch is closed, current flows from battery 162 through the solenoid valve, causing it to open. Closing of the switch also starts timer 166 and energizes indicator 168.

Timer 166 and indicator 168 can be integrated with actuator 130 in one device. Alternatively, timer 166 and indicator 168 may be provided separately.

In some embodiments, actuator 130 and valve 146 are integrated in one device. The single device may be a mechanically actuated valve.

Figure 4:
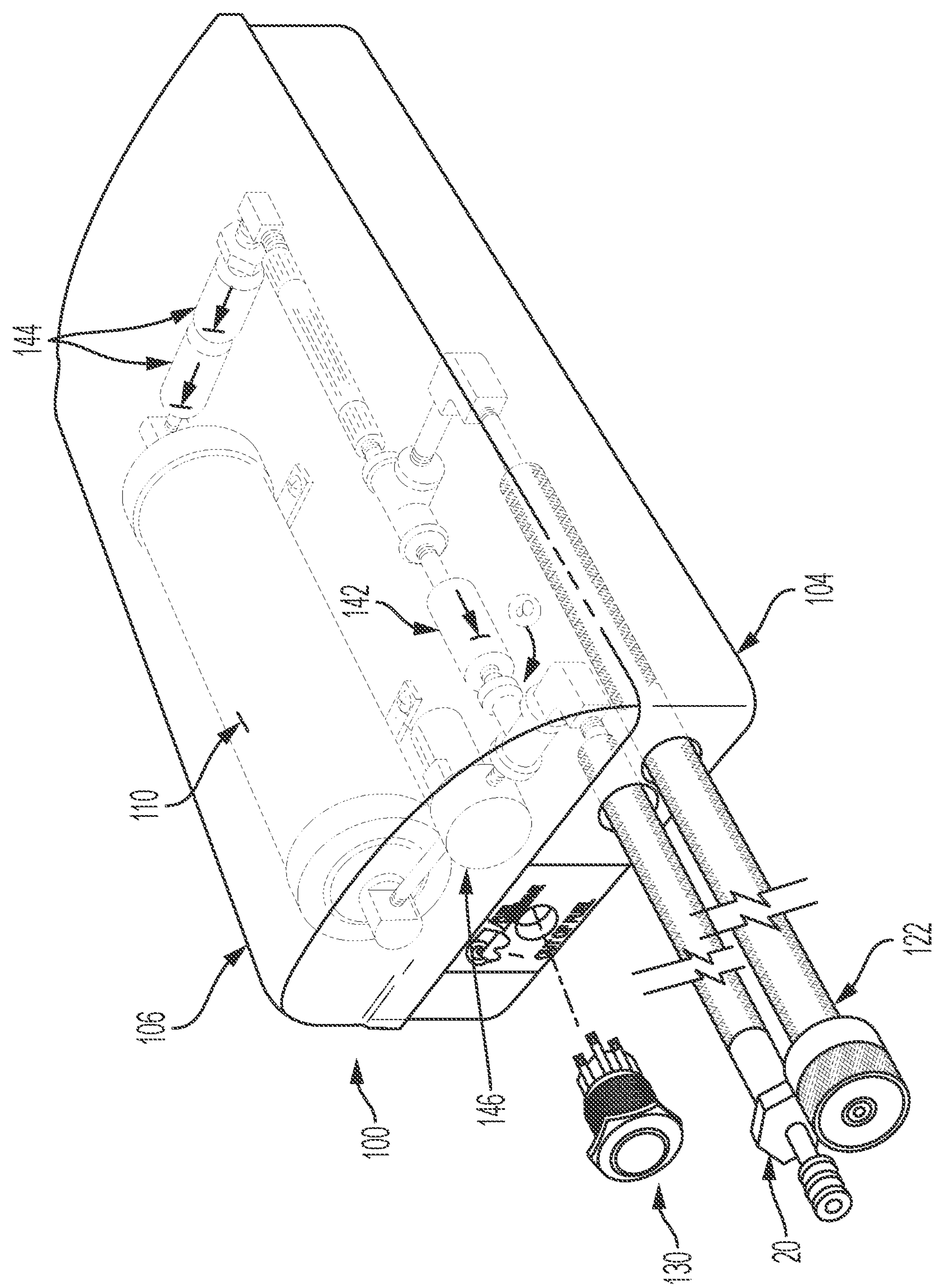
FIG. 4 is a perspective view of another embodiment of the FTRC module of FIG. 1.

FIG. 4 is a perspective view of another embodiment of FTRC module 100. In the present embodiment, two check-valves 144 are used. The inventors observed serendipitous occurrence of a "dribbling" event when only one check-valve 144 is used that causes fuel from reserve tank 100 to slowly bleed fuel to the engine, emptying and thus reducing the reserve fuel capacity of reserve fuel tank 100. Adding a second check-valve 144 provides a positive shut-off and prevents dribbling.

Figure 5:
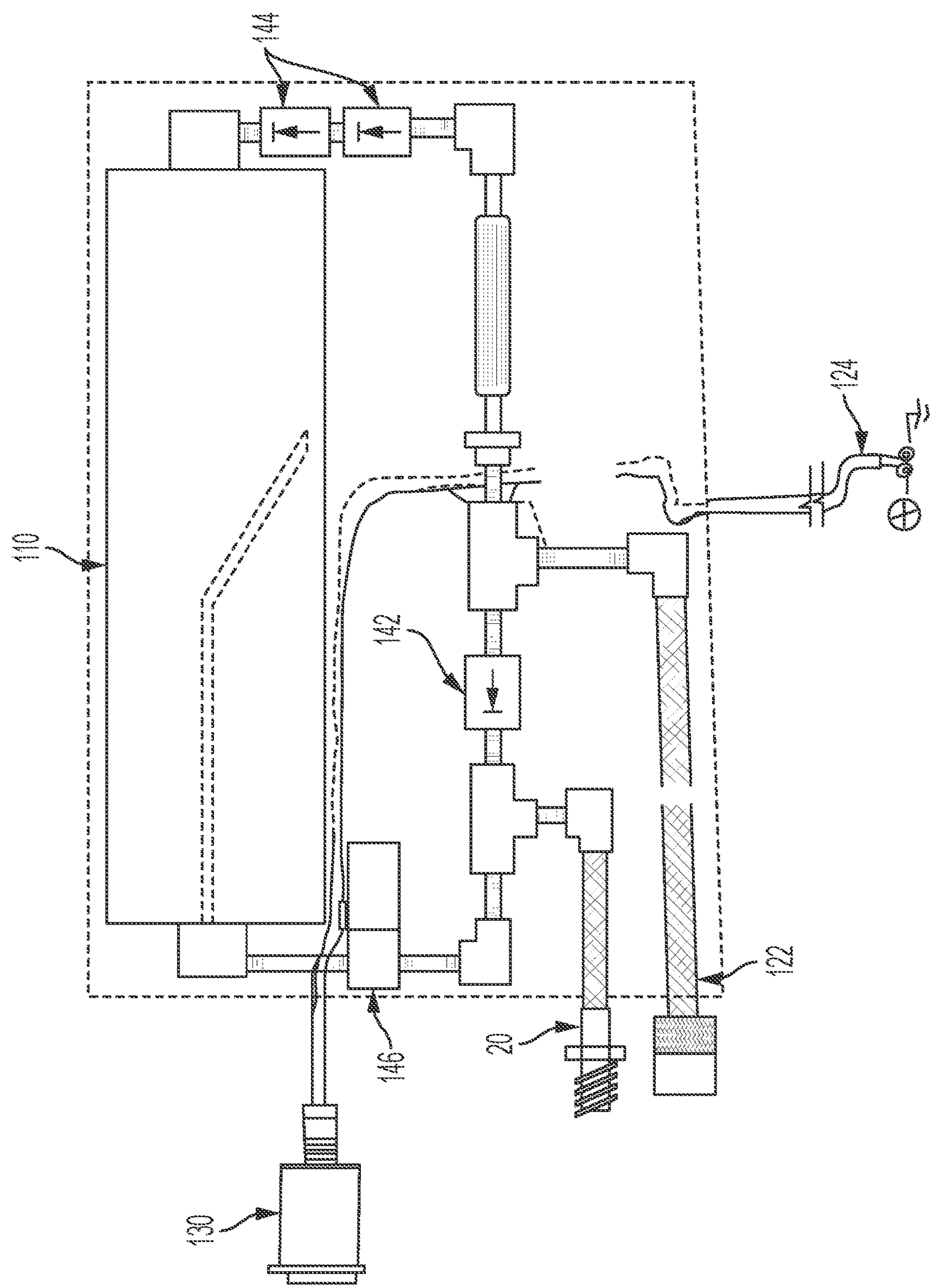
FIG. 5 is a top view of the FTRC module of FIG. 4.

As shown in FIG. 4, fluid circuit 140 comprises a number of T- and elbow connectors coupling the check valves, valve 146, and reserve fuel tank 110. FIG. 5 is a top view of the embodiment of the FTRC module of FIG. 4. Preferably the T- and elbow connectors, and any conduits therebetween (collectively, "fittings"), are made of brass. Preferably the fittings comprise a common internal diameter.

In operation, when fuel from main fuel tank 14 is exhausted, engine 12 shuts down. To restart the engine in the reserve mode, the user engages actuator 130 to open valve 146, and indicator 168 indicates the reserve mode of operation is active for a period of time set by the timer. When the timer runs out, valve 146 closes and the reserve fuel stops flowing, shutting down engine 12 after the predetermined time set by the timer. Of course the timer could be provided by an integrated circuit in a chip programmed with the predetermined time or, a first predetermined time to set the purging mode duration and a second predetermined time to set the reserve mode operation. The chip, or controller, can include outputs to control the valve and various indicators and inputs to receive signals from a switch or switches configured for actuating the valve, either for the predetermined time, or the first and second predetermined times.

In some embodiments of the FTRC module, inlet and outlet ports are connected to base 104 providing junctions B and E. Fittings inside the FTRC module fluidly connect the inlet and outlet ports to the check-valves and the valve. In such embodiments external hoses connect the inlet and outlet ports to the engine and the main fuel tank.

Figure 6:
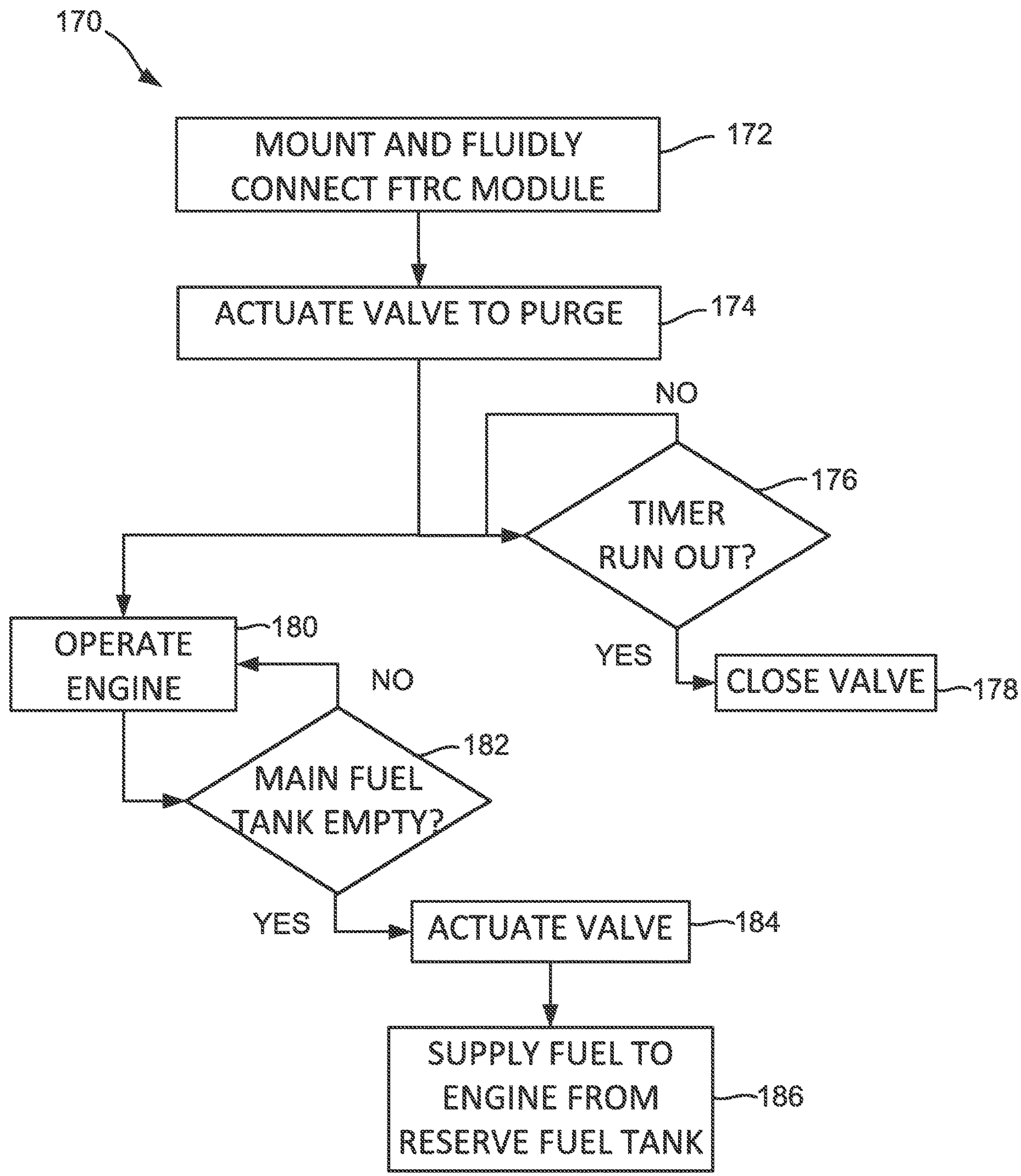
FIG. 6 is a flowchart depicting an embodiment of the operation of the FTRC module.

An embodiment of a method of operating a vehicle with a FTRC module will now be described with reference to a flowchart 170 depicted in FIG. 6. The method begins, at 172, by mounting and fluidly connecting the FTRC module to the engine and main fuel tank of a vehicle.

At 174, valve 146 is actuated to purge the fluid lines and fill the reserve fuel tank. The fluid lines are purged to the engine and not the environment. Purging may be necessary because air may have entered the fluid subsystem and condensation may have been formed due to temperature differentials and changes in fuel pressure. As described above, valve 146 may be a solenoid valve actuated by an electric switch when a user actuates the switch.

A timer may be started when valve 146 is actuated. At 176, the electrical subsystem waits for time to run out, and when the time runs out the timer causes the electrical switch to close, at 178, allowing the reserve fuel tank to remain full after the lines have been purged.

Meanwhile, at 180, the engine can be operated because it receives fuel from the main fuel tank and or the reserve fuel tank prior to the closing of valve 146.

The engine can be operated until the main fuel tank empties, at 182, at which time the engine is starved of fuel and stops, potentially "dead in the isle".

The operator may, at 184, actuate valve 146 to allow reserve fuel, at 186, to supply the engine. The check-valves prevent backflow to the main fuel tank. The vehicle may now be operated by a period of time set by the timer that controls valve 146.

The FTRC module can be fluidly connected to the engine at any time, including before the main fuel tank is empty or after it is refilled or replaced.

Valve 146 may be a mechanical or pneumatically operated valve using any known mechanically or pneumatically actuated valve, which are well known.

In one variation, two timers, with respective electrical switches, may be used in parallel, one timer/switch combination to control purging time after connection of the FTRC module to the main fuel tank and another to control duration of the reserve mode of operation. In another variation, a switch/timer combination may be used to control purging and a switch without timer may be used to engage the reserve mode of operation, in which case the engine may run until the reserve fuel tank empties. In a third variation, a switch without timer may be used to control purging and engage the reserve mode of operation. Without a timer, however, it is possible for the operator of the vehicle to forget to switch the valve off, thereby running the engine without reserving fuel in the reserve fuel tank. A single timer/switch combination is simpler and less expensive and therefore preferred.

Figure 7:
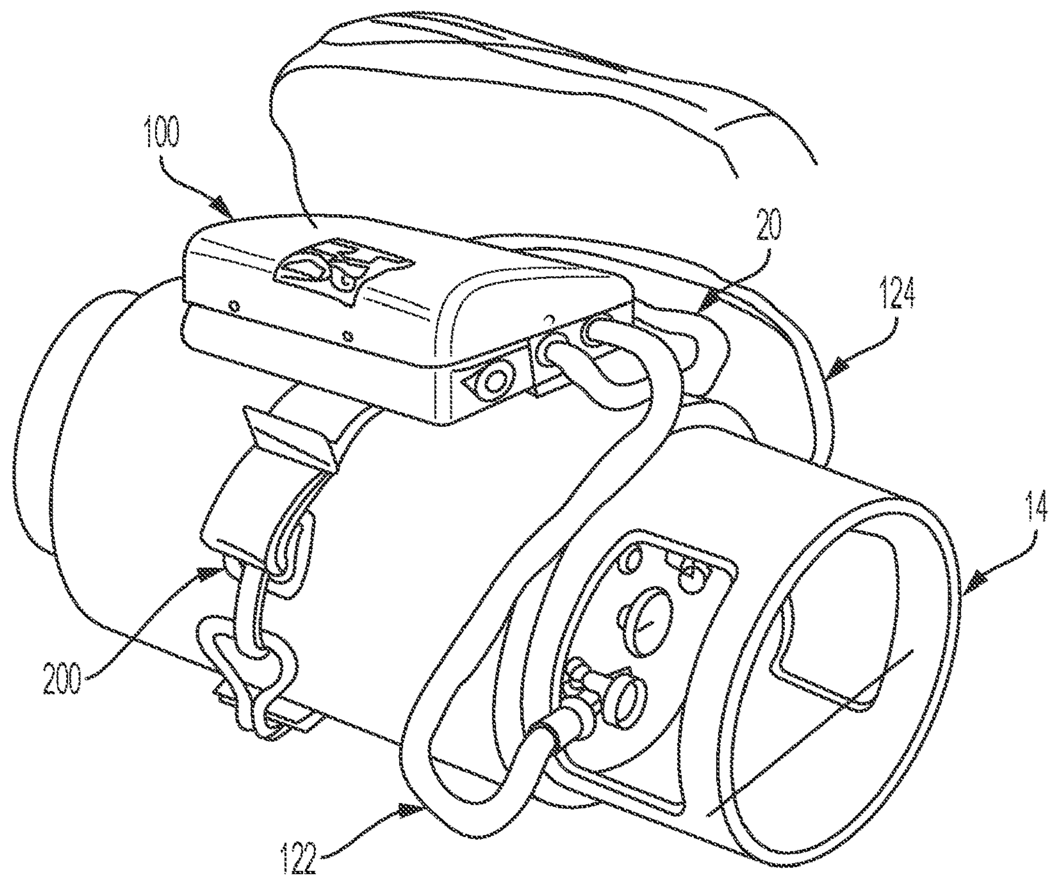
FIGS. 7 to 9 are perspective views of embodiments of the FTRC module of FIG. 1 showing different securement arrangements.
Figure 8:
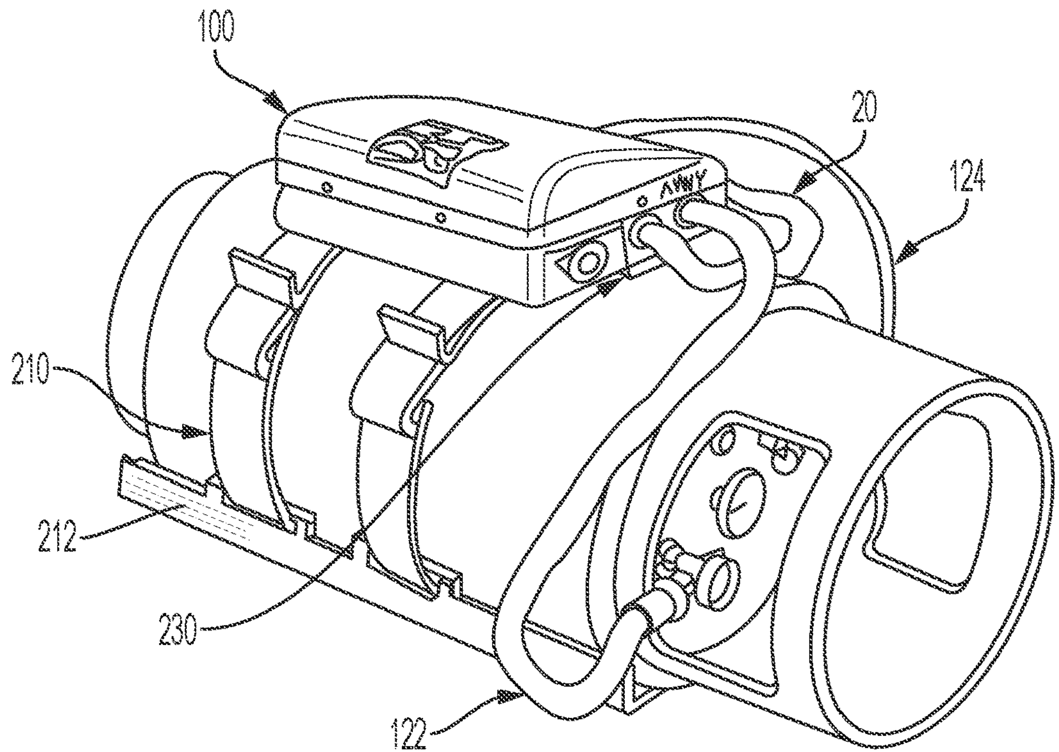
Figure 9:
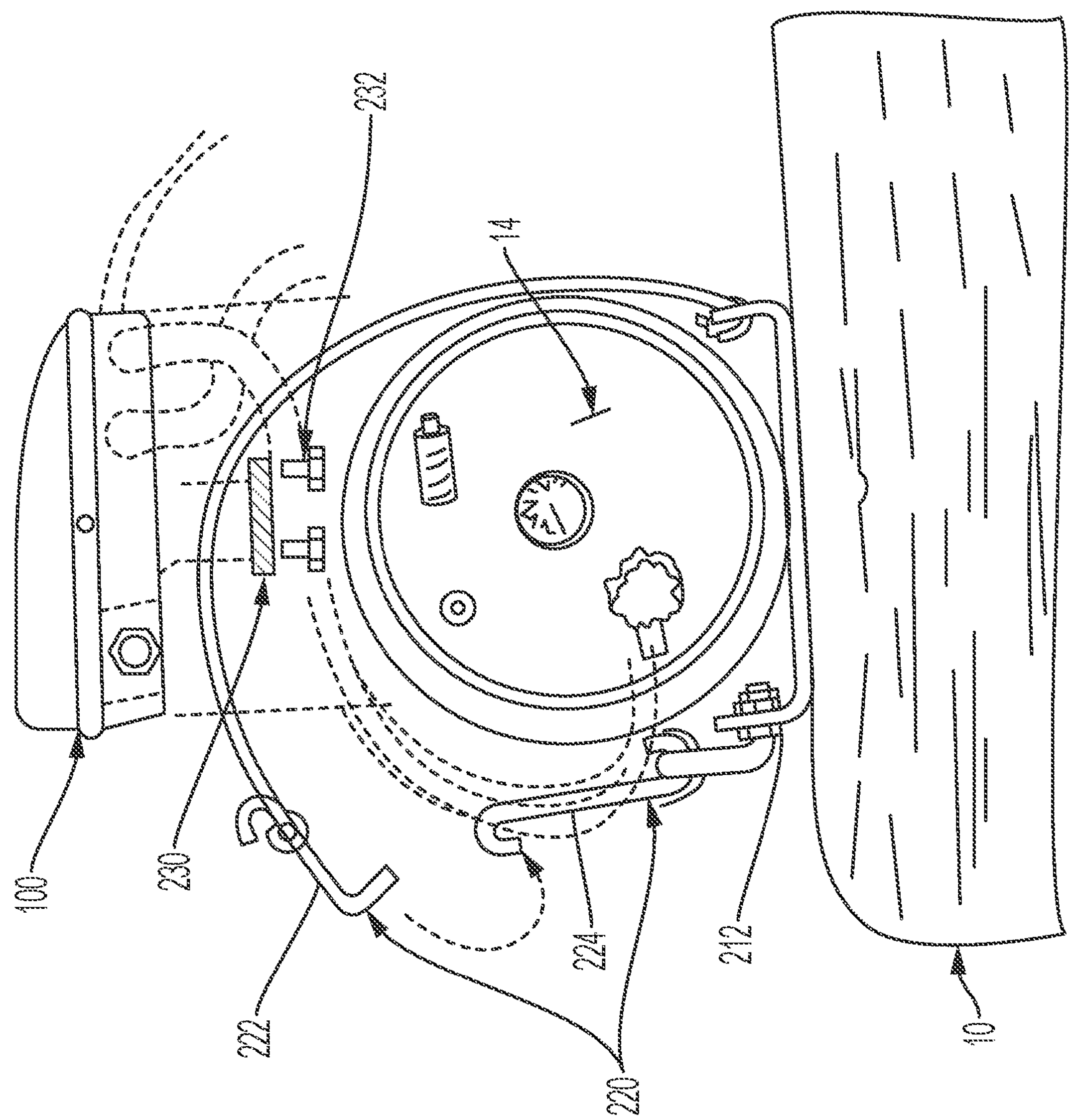

FIGS. 7 to 9 are perspective views of embodiments of the FTRC module showing different securement arrangements. Fork trucks may utilize single straps 200 (FIG. 7), dual straps 210 (FIG. 8), or steel belts 220 (FIG. 9) to secure the main fuel tank 14 to the fork truck. Some form of a quick-disconnect mechanism is provided to facilitate tank removal. As shown, the quick-disconnect mechanism may involve a pivotable hook 224 and a loop 222 on the end of a strap. A tank tray 212 may be provided to secure the main fuel tank 14. These quick-disconnect mechanisms are well known.

In one embodiment, a slider plate 230 is placed between the straps and main fuel tank 14 and secured to the FTRC module at both ends to prevent that the FTRC module slides off laterally. Fasteners 232 are provided to fasten slider plate 230 to FTRC module 100. Example fasteners include screws, bolts, and rivets. Advantageously, the same slider plate 230 may be used with any strap system. In a dual strap system, fasteners (one or more) may be provided between the straps. The fasteners 232 pass through through-holes in the slider plate 230 and are then fastened to the base 104.

In a variation of the present embodiment, a self-clinching fastener, e.g. a weldnut or PEM™ fastener, is embedded into the base 104. Broadly defined, a self-clinching fastener (also known as clinch or captive fastener) is any device, usually threaded, that, when pressed into ductile metal, displaces the host material around the mounting hole, causing it to cold flow into a specially designed annular recess in the shank or pilot of the fastener. A serrated clinching ring, knurl, ribs or hex head prevents the fastener from rotating in the host material once it has been properly inserted. Thus, self-clinching fasteners become a permanent part of the base 104 after installation. The fasteners 232 are screwed into the self-clinching fastener to secure the slider plate 230 to the base 104. Installing and tightening the fasteners 232, thus, will clamp the retaining straps 200 in FIG. 7, or 210 in FIG. 8, to the module 100. Self-clinching fastener installation methods include pressing, broaching, or welding.

The foregoing securement arrangements advantageously permit securement of a reserve fuel tank to a fork truck without modifying the fork truck, in particular without drilling holes or welding components to the safety cage, which may be impermissible, while removably mounting the reserve fuel tank to the vehicle below the rear line of sight of the operator.

We claim:

1. A method of operating a reserve fuel system including a reserve fuel tank retention and control (RTRC) module, the method comprising:

mounting the RTRC module onto a main fuel tank such that a longitudinal axis of a reserve fuel tank of the RTRC module is parallel to a longitudinal axis of the main fuel tank, the main fuel tank being operatively coupled to an exterior surface of a vehicle such that the longitudinal axis of the main fuel tank is positioned parallel to the ground surface upon which the vehicle is to be operated on;

fluidly connecting the RTRC module to the engine and to the main fuel tank;

actuating a valve of the RTRC module to a first position to allow fuel to flow from main fuel tank to the engine; and upon detecting that the main fuel tank is empty, actuating the valve to a second position allow fuel from the reserve fuel tank to supply the engine.

2. The method of claim 1, wherein upon detecting that the main fuel tank is empty, actuating the valve to the second position to allow fuel to flow from the reserve fuel tank to the engine comprises:

actuating the valve to the second position to allow fuel to flow from the reserve fuel tank to the engine for a predetermined time period; and actuating the valve to the first position after the predetermined time period.

3. The method of claim 2, wherein actuating the valve to the second position to allow fuel to flow from the reserve fuel tank to the engine for a predetermined time period comprises engaging a timer switch electrically connected to the valve, the timer switch maintaining the valve open for the predetermined time.

4. The method of claim 1, further comprising:

actuating the valve of the RTRC module to the first position for a predetermined time to purge moisture in a fuel supply hose into the engine.

5. The method of claim 1, wherein fluidly connecting the RTRC module to the engine and to the main fuel tank comprises:

fluidly connecting an inlet of the reserve fuel tank connected to a fuel intake hose adapted to fluidly connect the RTRC module and the main fuel tank; and fluidly connecting an outlet of the reserve fuel tank connected to the fuel supply hose adapted to fluidly connect the RTRC module and the engine.

6. The method of claim 1, wherein actuating the valve of the RTRC module comprises actuating the valve using an actuator.

7. The method of claim 6, wherein the valve comprises a solenoid valve and the actuator comprises an electric switch operable to open the valve.

8. A reserve fuel system comprising:

a reserve fuel tank retention and control (RTRC) module mounted onto a main fuel tank, the main fuel tank operatively coupled to a vehicle such that a longitudinal axis of the main fuel tank is positioned parallel to the ground surface upon which the vehicle is to be operated on, wherein the RTRC module comprises:

a fuel supply hose adapted to fluidly connect the RTRC module and an engine;

a fuel intake hose adapted to fluidly connect the RTRC module and the main fuel tank;

a reserve fuel tank having an inlet and an outlet and configured to receive fuel from the main fuel tank, wherein the inlet is coupled to the fuel intake hose and the outlet is coupled to the fuel supply hose;

a first fluid circuit fluidly connecting the main fuel tank to the engine; and a second fluid circuit fluidly connecting the main fuel tank to the engine via the reserve fuel tank.

9. The reserve fuel system of claim 8, wherein:

the first fluid circuit further comprises a first check-valve between the main fuel tank to the engine, the first check-valve allowing flow of the fuel from the fuel intake hose to the fuel supply hose; and the second fluid circuit further comprises a second check-valve between the fuel intake hose and the reserve fuel tank.

10. The reserve fuel system of claim 9, wherein the second fluid circuit further comprises a valve positioned between the reserve fuel tank and the fuel supply hose and having a first position and a second position, fuel being supplied from the main fuel tank to the engine via the first fluid circuit when the valve is in the first position, fuel being supplied from the reserve fuel tank to the engine via the second fluid circuit when the valve is in the second position.

11. The reserve fuel system of claim 10, wherein the position of the valve changes from the first position to the second position for a predetermined time period upon detecting that the main fuel tank is empty.

12. The reserve fuel system of claim 10, wherein the RTRC module further comprises an actuator operable to open the valve to allow fuel to flow from the reserve fuel tank to the engine.

13. The reserve fuel system of claim 12, wherein the actuator comprises an electric switch including the indicator and the timer, in a single device.

14. The reserve fuel system of claim 10, wherein the RTRC module further comprises a housing, wherein the reserve fuel tank, the first check-valve, the second check-valve, and the valve are positioned within the housing.

15. The reserve fuel system of claim 8, wherein the RTRC module is sized and configured to be portable.

16. A reserve fuel tank retention and control (RTRC) module for a vehicle, the RTRC module comprising:

a fuel supply hose adapted to fluidly connect the RTRC module and an engine of the vehicle;

a fuel intake hose adapted to fluidly connect the RTRC module and a main fuel tank of the vehicle;

a reserve fuel tank having an inlet and an outlet and configured to receive fuel from the main fuel tank, wherein the inlet is coupled to the fuel intake hose and the outlet is coupled to the fuel supply hose;

a first fluid circuit fluidly connecting the main fuel tank to the engine directly;

a second fluid circuit fluidly connecting the main fuel tank to the engine via the reserve fuel tank; and a valve positioned between the reserve fuel tank and the engine and having the first position and the second position, fuel being supplied from the main fuel tank to the engine when the valve is in the first position via the first fluid circuit, fuel being supplied from the reserve fuel tank to the engine when the valve is in the second position via the second fluid circuit.

17. The RTRC module of claim 16, further comprises an actuator operable to actuate the valve from the first position to the second position.

18. The RTRC module of claim 16, wherein:

the first fluid circuit further comprises a first check-valve between the main fuel tank to the engine, the first check-valve allowing flow of the fuel from the fuel intake hose to the fuel supply hose; and the second fluid circuit further comprises a second check-valve between the fuel intake hose and the reserve fuel tank.

19. The RTRC module of claim 16, wherein the position of the valve changes from the first position to the second position for a predetermined time period upon detecting that the main fuel tank is empty.

20. The RTRC module of claim 18, further comprises a housing, wherein the reserve fuel tank, the first check-valve, the second check-valve, and the valve are positioned within the housing.

* * * * *